United States Patent [19]
Adams et al.

[11] Patent Number: 5,592,142
[45] Date of Patent: Jan. 7, 1997

[54] HIGH SPEED GREATER THAN OR EQUAL TO COMPARE CIRCUIT

[75] Inventors: R. Dean Adams, Essex Junction; Donald A. Evans, Williston; Roy C. Flaker, Essex Junction, all of Vt.

[73] Assignee: International Business Machines Corporation, Armonk, N.Y.

[21] Appl. No.: 529,255

[22] Filed: Sep. 15, 1995

[51] Int. Cl.$^6$ .................................................. G06F 7/02
[52] U.S. Cl. ............................................... 340/146.2
[58] Field of Search ...................................... 340/146.2

[56] References Cited

U.S. PATENT DOCUMENTS

| | | |
|---|---|---|
| 4,737,664 | 4/1988 | Wilhelm et al. . |
| 4,755,696 | 7/1988 | Pickett . |
| 4,767,949 | 8/1988 | Mayweather, III . |
| 4,996,666 | 2/1991 | Duluk, Jr. . |
| 5,041,971 | 8/1991 | Carvey et al. . |
| 5,189,640 | 2/1993 | Huard . |
| 5,250,856 | 10/1993 | Burton et al. . |
| 5,254,883 | 10/1993 | Horowitz et al. . |
| 5,276,648 | 1/1994 | Yanagisawa et al. . |
| 5,400,007 | 3/1995 | McClure ............................ 340/146.2 |
| 5,471,188 | 11/1995 | Chappell et al. ................... 340/146.2 |

*Primary Examiner*—Margaret Rose Wambach
*Attorney, Agent, or Firm*—Howard J. Walter, Jr.; Craig J. Yudell; Andrew J. Dillon

[57] ABSTRACT

The high speed greater than or equal to compare circuit comprises an equal to compare circuit having M number of exclusive-OR gates input into a NOR gate, each exclusive-OR gate N of the M number of exclusive-OR gates receiving as inputs a Nth bit of a first digital number having M bits and a corresponding Nth bit of a second digital number having M bits, wherein $1<N<M$. Each exclusive-OR gate outputs a Nth not-equal signal indicating when the Nth bit of the first digital number is not equal to the corresponding Nth bit of the second digital number, whereby the output signal of the NOR gate indicates that the first digital number is equal to the second digital number. The circuit further comprises a greater than compare circuit including M number of NOR gates, each NOR gate N of the M NOR gates receives as inputs the complement of the Nth bit of the first digital number, a corresponding Nth bit of the second digital number, and each not-equal signal output from each exclusive-OR gate P, wherein $N<P<M$. The M NOR gates output a greater than signal indicating when the first digital number is greater than the second digital number. An output OR gate receives the NOR gate output signal from the equal to compare circuit and every greater than signal from the greater than compare circuit as inputs, and outputs a greater than or equal to signal indicating the first digital number is greater than or equal to the second digital number.

8 Claims, 8 Drawing Sheets

HIGH SPEED GREATER THAN OR EQUAL TO COMPARE CIRCUIT

BACKGROUND OF THE INVENTION

1. Technical Field

The present invention relates in general to comparator circuitry, and in particular to a high speed greater than or equal to compare circuit. Still more particularly, the present invention relates to a high speed greater than or equal to compare circuit utilized in a microprocessor dynamic branch prediction system.

2. Description of the Related Art

There are significant uses for high speed greater than or equal to compare circuits in high speed microprocessors. In particular, the greater than or equal to compare circuit is a key element to dynamic branch prediction. In high speed microprocessors, a branch target buffer stores possible branch addresses based on recent instructions executed by the processor. The data read from the branch target buffer will predict whether the next instruction is a branch, and if it is a branch operation, where the branch will probably jump to. This allows instructions to be continuously executed, rather than stopping the flow of instruction to find the branch address data when a branch is reached.

A fundamental component of the dynamic branch prediction is determining whether the potential branch address stored in the branch target buffer is greater than or equal to the current address. If it is determined that the predicted branch address is less than the current address, this potential rapidly, since this calculation is in series with the process of finding the next instruction to be read.

Figure 1:
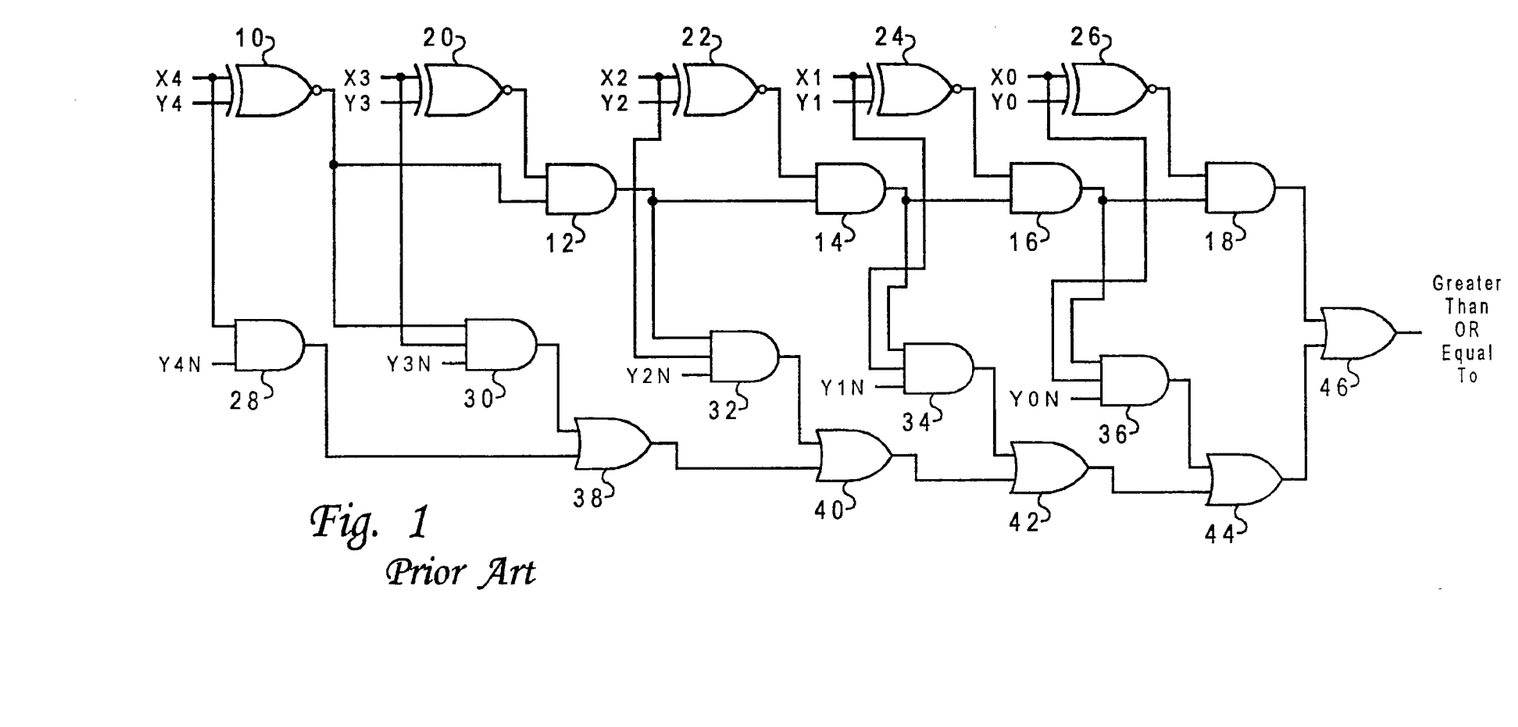
FIG. 1 depicts the conventional dynamic implementation of a greater than or equal to compare circuit.

Historically, the prior art has performed greater than or equal to comparisons utilizing a static logic implementation. More recently, the prior art has used dynamic logic greater than or equal to compare circuits because of their enhanced speed. An example of a conventional differential cascode voltage switch (DCVS) dynamic logic circuit is shown in FIG. 1. This DCVS circuit performs a greater than or equal to compare using CMOS transistors in a "series mode" that takes about one nanosecond to produce its output and has seven logic gate delays. This series compare operation is also referred to as a domino compare and it is well-known to those skilled in the art.

As seen in FIG. 1, 5 bits of an X address (X(0:4)) and 5 bits of a Y address (Y(0:4)) are compared and the result shows whether the X bit address is greater than or equal to the Y bit address. With 4 being the high order bit, the X4 and Y4 bits are XNORed (XNOR 10) and then ANDed (AND gates 12–18) with the XNOR (XNOR gates 20–26) of each succeeding pair. If the result from AND gate 18 is a logic high (1), then the X and Y bits are equal.

To perform the greater than compare, the high order bit X4 and the complement of the high order bit Y4 are input into AND gate 28, which results in an output of 1 only when X4 is greater than Y4. The remaining lower order bits are compared in 3-input AND gates 30–36. The inputs to AND gate 30 are the output of XNOR gate 10, X3, and Y3, resulting in a high output only when X4 and Y4 are equal and X3 is greater than Y3. Each of the AND gates 32–36 receive a corresponding X bit, a corresponding Y bit complement, and the output of AND gates 12–16, respectively, resulting in an output of 1 from one of the AND gates 32–36 if the corresponding X bit is greater than the corresponding Y bit and all the preceding bits have been equal. The outputs from AND gates 28–36 are input into OR gates 38–44, the output of OR gate 44 indicating the X address is greater than the Y address by a high output signal. The outputs of AND gate 18 and OR gate 44 are ORed together at OR gate 46 to produce a greater than or equal to result.

It will be appreciated by those skilled in the art that the greater than or equal to compare of FIG. 1 is highly serial in nature. The worst case path has seven logic gate delays. Even after boolean reduction is performed and the DCVS dynamic circuit is optimized to a standard load, it will have a delay of 1.0 nanoseconds and be approximately 12,000 squared microns in size. A static implementation of the circuit in FIG. 1 would probably take up a slightly larger area and be at least 20% slower. Therefore, it would be desirable to provide a greater than or equal to compare circuit that is of substantially greater speed than the prior art designs, while consuming the same amount of chip area as the dynamic or static implementations used in the prior art.

SUMMARY OF THE INVENTION

According to the present invention, a high speed greater than or equal to compare circuit is provided. The circuit comprises an equal to compare circuit having M number of exclusive-OR gates input into a NOR gate, each exclusive-OR gate N of the M number of exclusive-OR gates receiving as inputs a Nth bit of a first digital number having M bits and a corresponding Nth bit of a second digital number having M bits, wherein $1<N<M$. Each exclusive-OR gate outputs a Nth not-equal signal indicating when the Nth bit of the first digital number is not equal to the corresponding Nth bit of the second digital number, whereby the output signal of the NOR gate indicates that the first digital number is equal to the second digital number. The circuit further comprises a greater than compare circuit including M number of NOR gates, each NOR gate N of the M NOR gates receives as inputs the complement of the Nth bit of the first digital number, a corresponding Nth bit of the second digital number, and each not-equal signal output from each exclusive-OR gate P, wherein $N<P<M$. The M NOR gates output a greater than signal indicating when the first digital number is greater than the second digital number. An output OR gate receives the NOR gate output signal from the equal to compare circuit and every greater than signal from the greater than compare circuit as inputs, and outputs a greater than or equal to signal indicating the first digital number is greater than or equal to the second digital number.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 2:
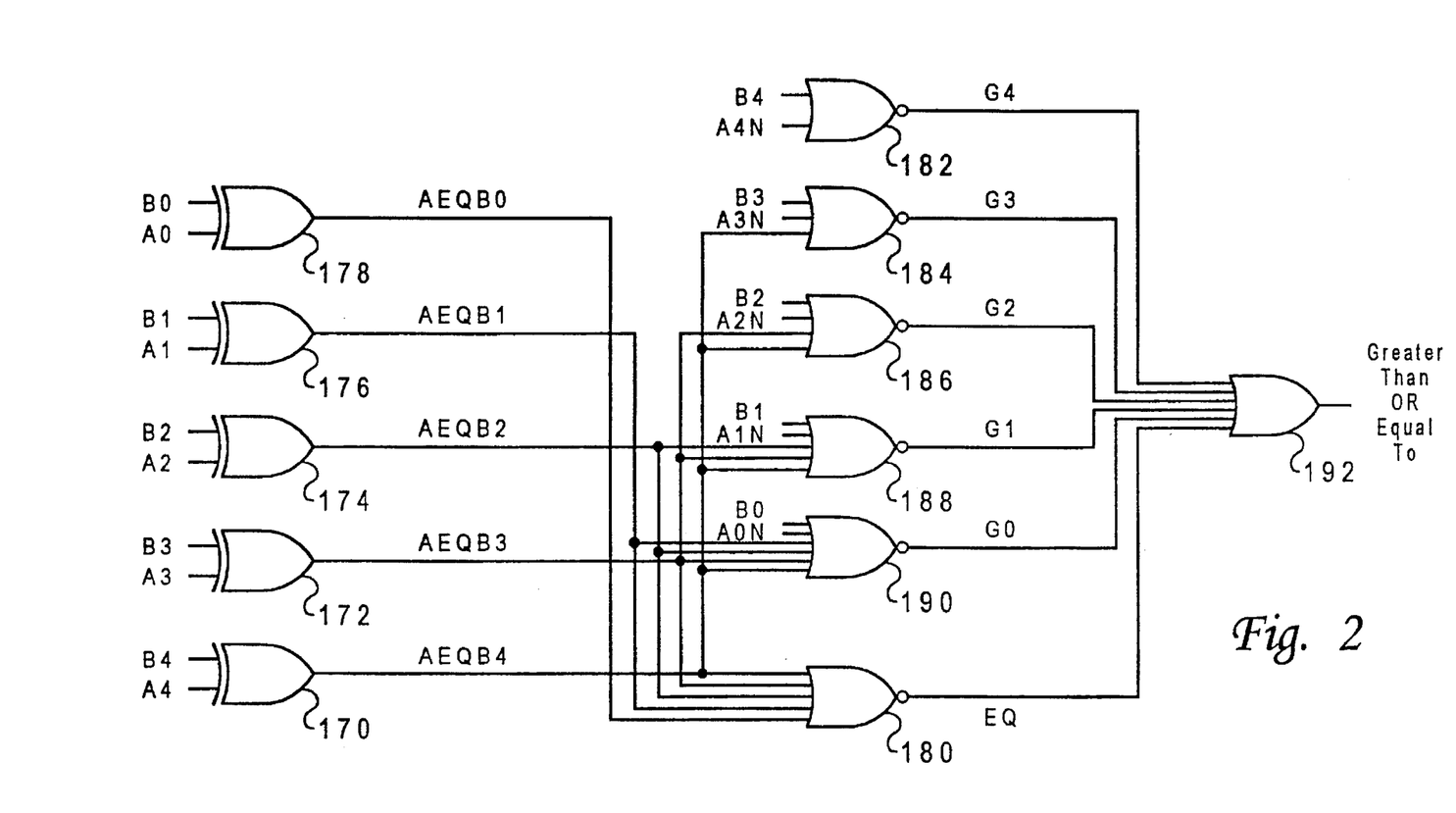
FIG. 2 depicts the greater than or equal to compare circuit of the present invention.

Referring now to FIG. 2, there is shown the greater than or equal to compare circuit of the present invention. XOR gate 170 receives the high order bits A4 and B4 from address A and address B, respectively. The output AEQB4 of XOR gate 170 indicates when the high order bits A4 and B4 are equal by a low level signal. Similarly, XOR gates 172–178 compare each of the lower significant bits A3-A0, B3-B0 to produce outputs AEQB3-AEQB0, which indicate by a low level signal that bits 3-0, respectively, are equal.

Output signals AEQB4-AEQB0 are input into NOR gate 180. If all the input signals AEQB4-AEQB0 are low level signals, NOR gate 180 outputs an active high signal, EQ, indicating the address A is equal to address B. If any one of the address bits 4-0 are not equal, the corresponding output signal from XOR gates 170–178 will assert an active high signal, switching the output of NOR gate 180 low, thereby indicating that address A is not equal to address B.

NOR gate 182 has as inputs the most significant bit of address B, B4, and the complement of the high order bit of address A, A4. As will be appreciated, the output of NOR gate 182, G4, indicates when the high order bit A4, is greater than the high order B4. NOR gate 184 determines if bit 3 of address A is greater than bit 3 of address B, when bit 4 of the two addresses is equal. The inputs to NOR gate 184 are bit 3 of address B, B3, and the complement of bit 3 of address A, A3, and the output signal from XOR gate 170, AEQB4, which indicates that bit 4 of address A is equal to bit 4 of address B. As will be appreciated, an active high output of NOR gate 184 indicates that A3 is greater than B3 where the higher order bits are equal, thereby indicating that address A is greater than address B.

In a similar manner, NOR gates 186–190 compare bits 2-0 to determine if each bit of address A is greater than the corresponding bit of address B, where the higher order bits are equal. Bits 2-0 of address B and the complement of bits 2-0 of address A are input into NOR gates 186–190, respectively. In addition, NOR gates 186–190 receive the AEQB signals for all higher order bits. In particular, NOR gate 186 receives AEQB4-AEQB3, NOR gate 188 receives AEQB4-AEQB2, and NOR gate 190 receives AEQB4-AEQB1.

A greater than or equal to output signal is produced by OR gate 192. An active high output signal indicates address A is greater than or equal to address B an active high output signal. Each of the output signals from NOR gates 180–190 are input into OR gate 192. It will be appreciated that if any one of the output signals G4-G0 are an active high signal, address A has been determined to be greater than address B. In addition, an active high signal output from NOR gate 180 indicates that address A is equal to address B. Therefore, if any one of the output signals G4-G0 or output signal EQ is an active high level, an active high output from OR gate 192 is produced, indicating that address A is greater than or equal to address B.

By comparing the schematic diagram of the present invention in FIG. 2 with the schematic diagram of the prior art greater than or equal to compare circuit shown in FIG. 1, the significant speed advantages of the greater than or equal to compare circuit of the present invention are readily apparent. The worst case signal path through the circuit of FIG. 1 has seven logic gate delays before a valid output signal can be produced. The circuit of the present invention has a worst case signal path of only three logic gate delays to produce a valid output signal indicating the greater than or equal to condition. It can be seen from the schematic diagram of FIG. 2 that this is accomplished by performing the greater than evaluation of each bit in parallel. The significant speed advantage of the present invention directly enhances the speed of a microprocessor by increasing the speed of operations such as dynamic branch prediction and out of order execution.

Figure 3:
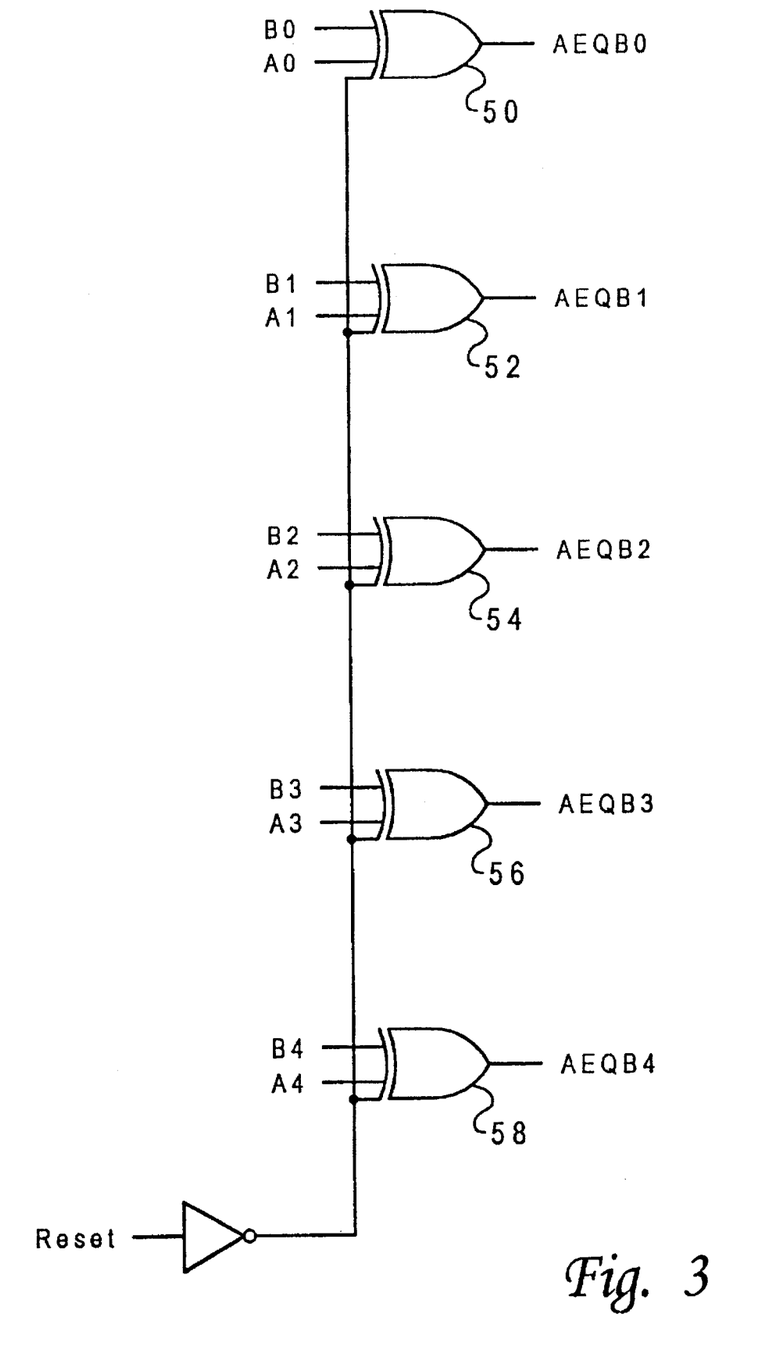
FIG. 3 is a schematic diagram of an equal to compare circuit for each bit of two addresses, in accordance with the preferred embodiment of the present invention.
Figure 4:
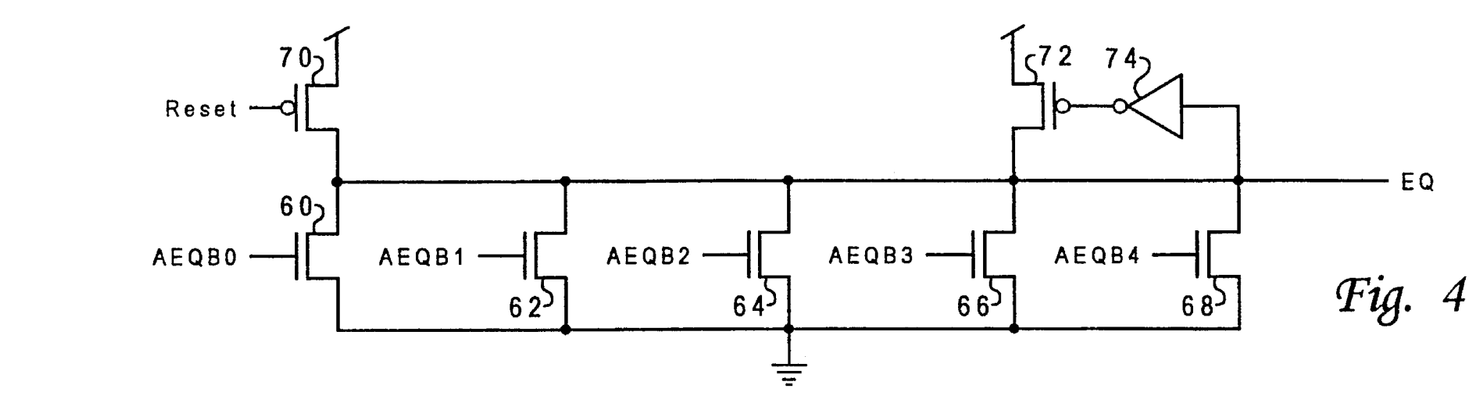
FIG. 4 depicts a schematic diagram of an equal to compare circuit, in accordance with the preferred embodiment of the present invention.

The circuits shown in FIGS. 3 and 4 show the actual transistor implementation for performing the equal to compare. Each of the exclusive-or (XOR) gates 50–58 is implemented with high speed dynamic logic and receives a different bit of the A address (A(0:4)) and the corresponding bit from the B address (B(0:4)). Each of the XORs 50–58 also receive a reset signal for resetting the output of the gates to ground. Although the preferred embodiment is implemented with dynamic logic to increase the speed of the circuit, it will be understood that other types of circuitry could be used. Also, although the invention is described for addresses of 5 bits, the invention can be practiced for addresses of any size.

Each output from XOR gates 50–58 is input at the gate of transistors 60–68, respectively, as is indicated in FIG. 4. XOR gates 50–58 produce a high output when their input bits are not equal and produce a low output when their input bits are equal. If all bits of the two addresses being compared are equal, the inputs at the gates of NMOS transistors 60–68 are zeros, which maintains the transistors in an off state. The output EQ indicates that address A is equal to address B by maintaining the high output it was precharged to during a reset period through PMOS transistor 70, and to which it has been held by source transistor 72 and invertor 74. As will be appreciated by those skilled in the art, transistor 72 and invertor 74 form an output locking mechanism that maintains the charge on output EQ when the output is at a high level.

If any one or more of the XOR gates 50–58 produces a high output indicating that its input address A bit is not equal to the corresponding address B bit, the connected one or more transistors 60–68 will be turned on. This will force the EQ output to a low level (ground), indicating that the address A is not equal to the address B. As will be appreciated, the resulting high output from invertor 74 will turn off source transistor 72.

Figure 5:
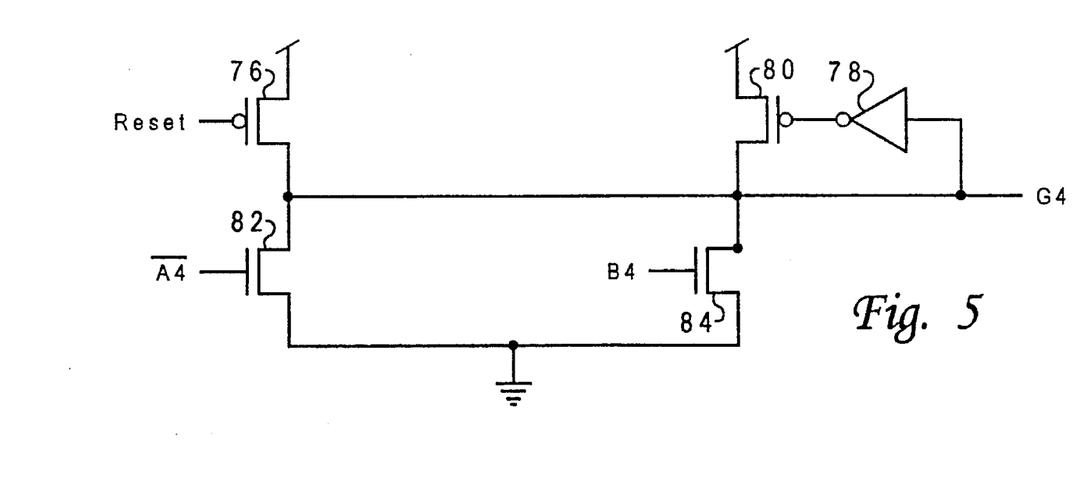
FIG. 5 depicts a schematic diagram of a greater than compare of the first high order address bits, in accordance with the preferred embodiment of the present invention.

The greater than compare function is performed by the circuits shown in FIGS. 5–9. FIG. 5 shows a circuit used to check the high order bit (A4 and B4) of the two input addresses to determine if A>B.

The circuit is precharged during a reset period during which PMOS transistor 76 is turned on to charge the circuit output G4 to a high level corresponding to logical "1". As before, invertor 78 and PMOS transistor 80 form an output locking mechanism that maintains G4 when at a high output level.

The inputs to NMOS transistors 82 and 84 are the A4 complement, A4, and B4, respectively. The A4 and B4 signals are precharged as low signals during the reset period. If A4 is a "1" and B4 is a "0", neither of the NMOS transistors 82, 84 will turn on, and G4 remains high. Consequently, a high G4 output indicates that address A is greater than address B. If either A4 or B4 is high, A4 is either equal to or less than B4, and one or both of NMOS transistors 83, 84 will turn on, sending the G4 output low.

Figure 6:
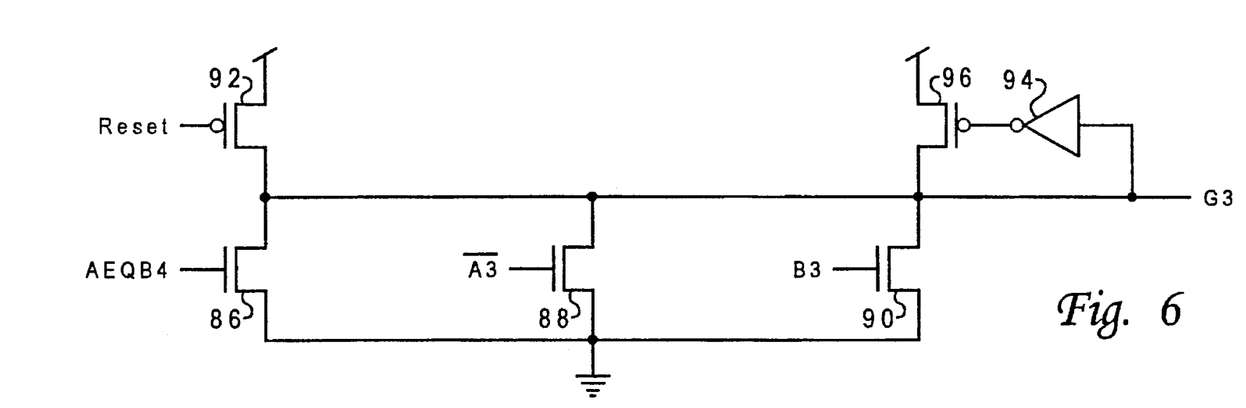
FIG. 6 depicts a schematic diagram of a greater than compare of the second high order address bits, in accordance with the preferred embodiment of the present invention.

If the high order bits A4 and B4 are equal, the circuit shown in FIG. 6 performs a greater than compare on the next lower order bit (bit 3). The AEQB4 input at the gate of NMOS transistor 86 is received from XOR gate 58, and indicates whether the high order bit A4 is equal to the high order bit B4. The inputs to the NMOS transistors 88, 90 are A3 and B3, respectively.

The output signal G3 is precharged to a high output level during the reset period by PMOS transistor 92 and is held at a high output level by the output locking mechanism formed by invertor 94 and PMOS transistor 96. During the greater than compare function, the output signal G3 will remain high only if A4=B4 (AEQB4=0), A3=1 and B3=0, which indicates that address A is greater than address B. If any of the conditions are not met, one or more of the NMOS transistors 86–90 will be turned on, forcing the output signal to a low level, and thereby indicating that address A is not greater than address B, based on bits A4-A3, B4-B3.

Figure 7:
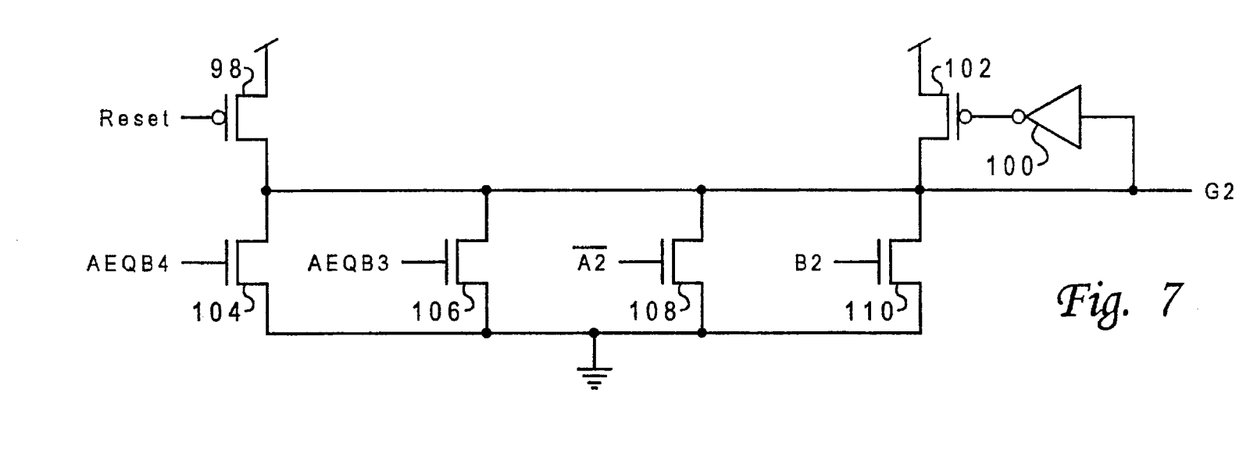
FIG. 7 depicts a schematic diagram of a greater than compare of the third high order address bits, in accordance with the preferred embodiment of the present invention.

FIG. 7 shows the greater than compare circuit used to determine if A>B by comparing bit 2(A2 and B2), if the preceding higher order bits are equal. The greater than compare output signal G2 is precharged to a high level during the reset period by PMOS transistor 98. The output signal G2 is maintained at a high output level by output locking mechanism 100, 102 until the output is changed. The output signal AEQB4 from XOR gate 58 is input at the gate of NMOS transistor 104. The output signal AEQB3 from XOR gate 56 is input at the gate of NMOS transistor 106. The complementary signal A2 and signal B2 are input at the gates of NMOS transistors 108 and 110, respectively. During the greater than compare function, if either of the high order bits are not equal (i.e., AEQB(3:4)=1),A2=0, or B2=1, one or more of NMOS transistors 104–110 will turn on and force output signal G2 to a low level, indicating that address A is not greater than address B. If both higher order bits are equal, A2=1, and B2=0, G2 will indicate that address A is greater than address B by maintaining a high output signal, based on bits A4-A2, B4-B2.

Figure 8:
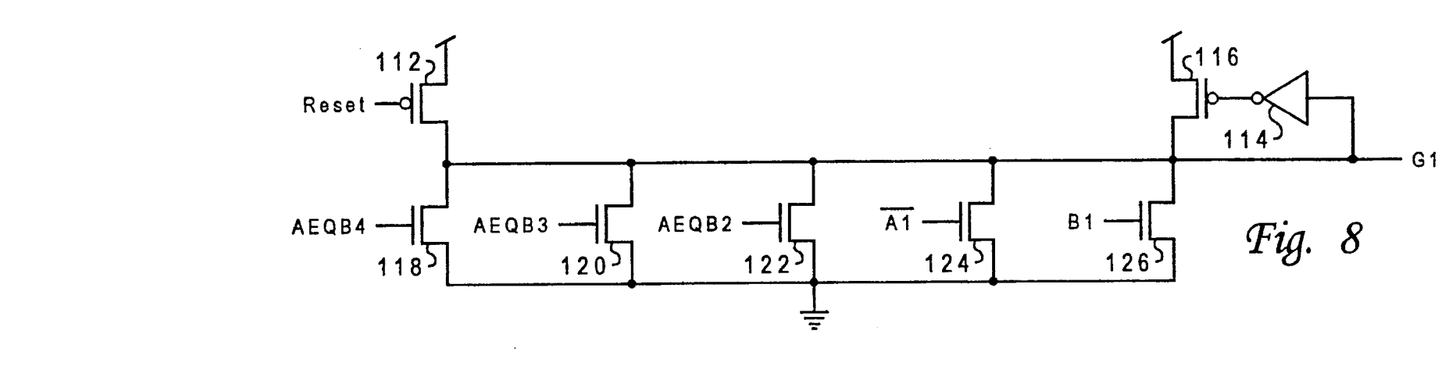
FIG. 8 depicts a schematic diagram of a greater than compare of the fourth high order address bits, in accordance with the preferred embodiment of the present invention.

FIG. 8 shows the greater than compare circuit used to determine if A>B by comparing bit 1(A1 and B1), if the preceding higher order bits are equal. The greater than compare output signal G1 is precharged to a high level during the reset period by PMOS transistor 112. The output signal G1 is maintained at a high output level by output locking mechanism 114, 116 until the output is changed. The output signal AEQB4 from XOR gate 58 is input at the gate of NMOS transistor 118. The output signal AEQB3 from XOR gate 56 is input at the gate of NMOS transistor 120. The output signal AEQB2 from XOR Gate 54 is input at the gate of NMOS transistor 122. The complementary signal A1 and signal B1 are input at the gates of NMOS transistors 124 and 126, respectively. During the greater than compare function, if any of the higher order bits are not equal (i.e., AEQB(2:4)=1), A1=0, or B1=1, one or more of NMOS transistors 118–126 will turn on and force output signal G1 to a low level, indicating that address A is not greater than address B. If all higher order bits are equal, A1=1, and B1=0, G1 will indicate that address A is greater than address B by maintaining a high output signal, based on bits A4-A1, B4-B1.

Figure 9:
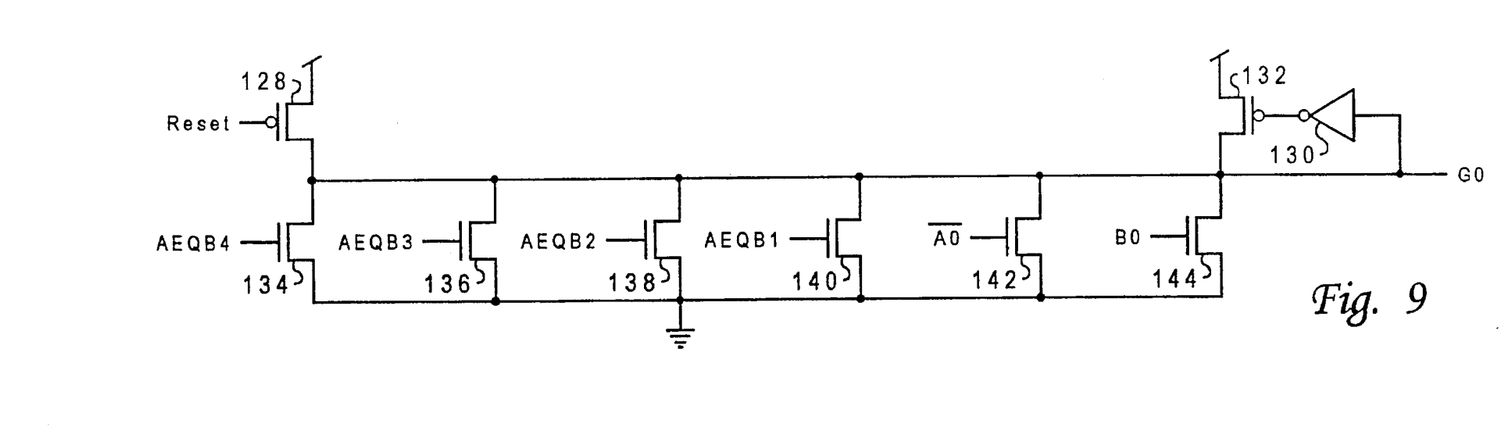
FIG. 9 depicts a schematic diagram of a greater than compare of the fifth high order address bits, in accordance with the preferred embodiment of the present invention.

FIG. 9 shows the greater than compare circuit used to determine if A>B by comparing bit 0(A0 and B0), if the preceding high order bits are equal. The greater than compare output signal G0 is precharged to a high level during the reset period by PMOS transistor 128. The output signal G0 is maintained at a high output signal by output locking mechanism 130, 132 until the output is changed. The output signal AEQB4 from XOR gate 58 is input at the gate of NMOS transistor 134. The output signal AEQB3 from XOR gate 56 is input at the gate of NMOS transistor 136. The output signal AEQB2 from XOR gate 54 is input at the gate of NMOS transistor 138. The output signal AEQB 1 from XOR gate 52 is input at the gate of NMOS transistor 140. The complementary signal A0 and signal B0 are input at the gates of NMOS transistors 142 and 144, respectively. During the greater than compare function, if any of the higher order bits are not equal (i.e., AEQB(1:4)=1), A0=0, or B0=1, one or more of NMOS transistors 134–144 will turn on and force output signal G0 to a low level, indicating that address A is not greater than address B. If all higher order bits are equal, A0=1, and B0=0, G0 will indicate that address A is greater than address B by maintaining a high output signal.

Figure 10:
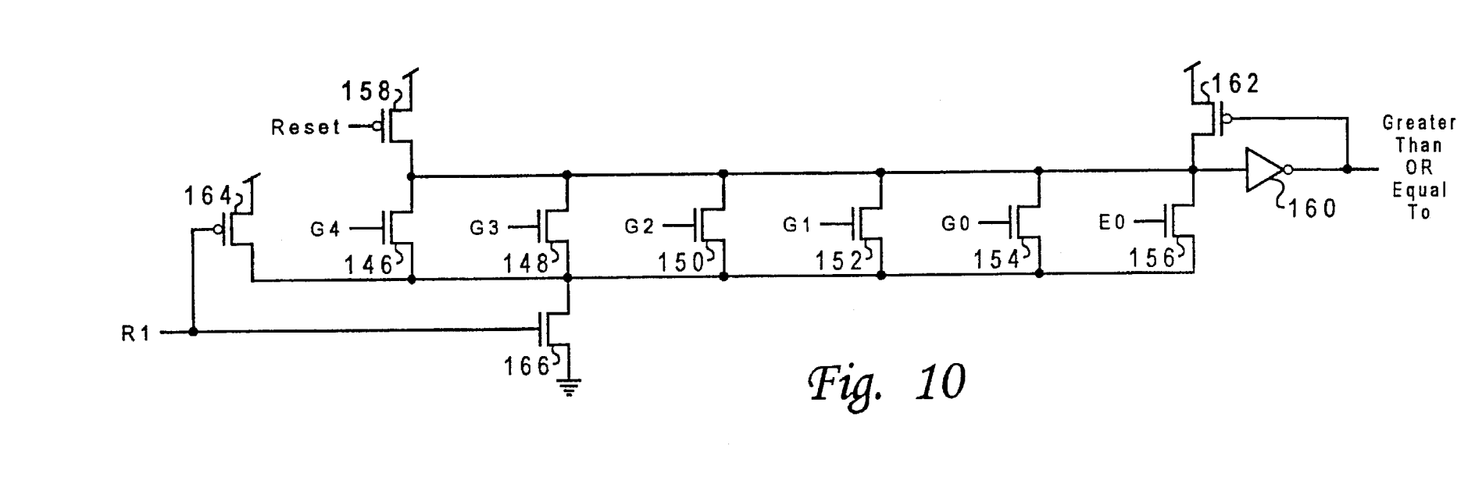
FIG. 10 is a schematic diagram of the final stage of the greater than or equal to compare circuit of the preferred embodiment of the present invention.

The output from the equal to compare circuit (EQ) and the outputs from the greater than compare circuits (G4-G0) are fed into a wide setable OR node, as shown in FIG. 10. The greater than compare output signals G4-G0 are input into NMOS transistors 146–154. The equal to compare output signal EQ is input at the gate of NMOS transistor 156.

The drains of NMOS transistors 146–156 are precharged to a high signal level during a reset period by PMOS transistor 158. The greater than or equal to output signal, which is at the output of invertor 160, is held to a low output level, when the input to invertor 160 is high, by an output locking mechanism formed by invertor 160 and PMOS transistor 162.

If the A address bits A(0:4) are not greater than or equal to the B address bits B(0:4), then the EQ and G4-G0 signals all evaluate low prior to the signal R1 being asserted high, and the output of this circuit remains low. If the address A is greater than or equal to the address B, then one of the inputs to NMOS transistors 146–156 will be high, and the output will be switched high when the enable signal R1 is high.

The enable signal R1 is generated from the address data inputs to provide a self-timed circuit operation. R1 is the delayed OR of the precharged low, true and complement of the latest arriving input bit. The enable signal R1 is input at the gates of PMOS transistor 164 and NMOS transistor 166. During the period that R1 is low, PMOS transistor 164 is on, forcing NMOS transistors 146–156 into cutoff and also preventing charge-sharing discharge of the input to inverter 160. During the enable phase, signal R1 is high to turn off PMOS transistor 164 and turn on NMOS transistor 166. If any one of the inputs to the NMOS transistors 146–156 is high during the enable phase, the input to invertor 160 is pulled to ground. A precharge period occurs prior to each evaluation.

Figure 11:
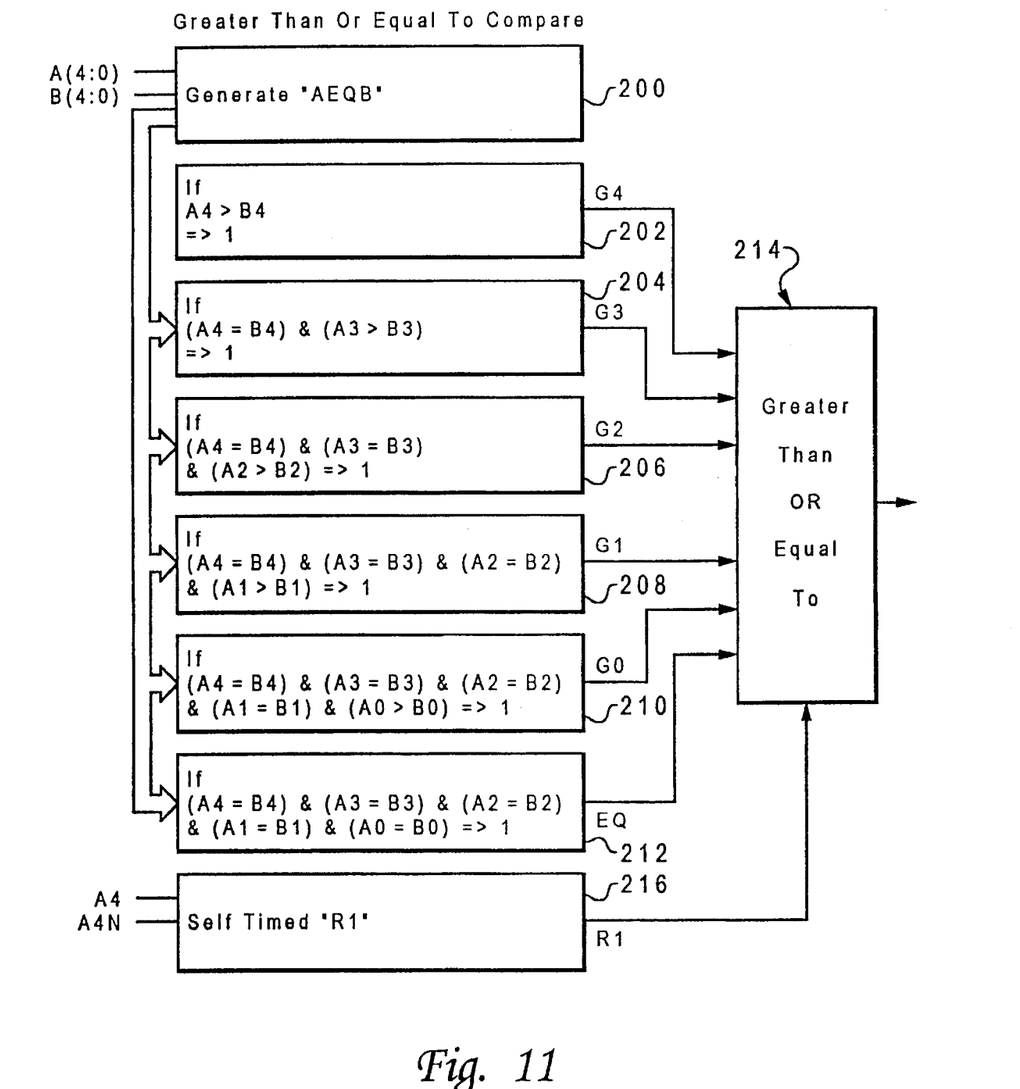
FIG. 11 is a block flow diagram of the greater than or equal to compare utilized in performing dynamic branch prediction, in accordance with the preferred embodiment of the present invention.

Referring now to FIG. 11, there is shown a flow diagram of a method of dynamic branch prediction, according to a preferred embodiment of the present invention. The stored branch address in a branch target buffer and the current address of an executing program in a microprocessor are input into the greater than or equal to compare circuit of the present invention. This is shown at block 200 where the stored branch address (A(4:0)) and the current address (B(4:0)) are both input into block 200. The outputs from block 200 are the signals AEQB4-0, each of which indicates whether its corresponding bits 4-0 for addresses A and B are equal. The outputs from block 200 are input to each of the blocks 204–212.

At block 202, a determination is made whether A4>B4. An affirmative decision produces an output of 1 from block 202 at G4. At block 204, if AEQB4 equals 0 (A4=B4) and A3>B3, a 1 is output a G3. At block 206, if AEQB(3:4)=0 and A2>B2, a 1 is output on G2. At block 208, if AEQB(2:4)=0 and A1>B1, a 1 is output on G1. At block 210, if AEQB(1:4)=0 and A0>B0, a 1 is output on G0. At block 212, if AEQB(0:4)=0, a 1 is output at EQ.

Each of the outputs from blocks 202–212 are input into block 214, which performs an OR function on each of the input signals G4-G0 and EQ during an enable phase timed by the input signal R1 output by block 216. The signal R1 is not produced during the period that the address signal A4 and its complement, A4, are both low. This condition exists immediately before blocks 200–212 have produced output signals to block 214. This period may occur when the address bits are being precharged, for example. The output of block 214 indicates when the stored branch address is greater than or equal to the current address. If it is so indicated and other conditions are met, the processor may assume that the stored branch address is valid and proceed to retrieve the branch address data.

As will be appreciated by those skilled in the art, what we have described is a self-timed greater than or equal to compare circuit that is configured in a substantially parallel structure, thereby allowing much faster performance. For example, in actual tests, the greater than or equal to compare circuit of the present invention was able to perform its compare function in 0.61 ns. The delay through a prior art DCVS dynamic circuit was found to have a delay of 1.0 ns for a comparable load. Moreover, the greater than or equal to compare circuit of the present invention can be manufactured using approximately the same number of transistors and circuit area as a prior art DCVS dynamic circuit design. In summary, the substantially parallel structure of the greater than compare circuits in the comparator of the present invention results in a substantially improved high speed greater than or equal to compare circuit.

While the invention has been particularly shown and described with reference to a preferred embodiment, it will be understood by those skilled in the art that various changes in form and detail may be made therein without departing from the spirit and scope of the invention.

What is claimed is:

1. A greater than or equal to compare circuit comprising:

an equal to compare circuit including M number of exclusive-OR gates input into a NOR gate, each exclusive-OR gate N of the M number of exclusive-OR gates, wherein 1<N<M, receiving as inputs a Nth bit of a first digital number having M bits and a corresponding Nth bit of a second digital number having M bits, and outputting a Nth not-equal signal indicating when the Nth bit of the first digital number is not equal to the corresponding Nth bit of the second digital number, wherein the output signal of the NOR gate indicates that the first digital number is equal to the second digital number;

a greater than compare circuit including M number of NOR gates, each NOR gate N of the M NOR gates receiving as inputs the complement of the Nth bit of the first digital number, a corresponding Nth bit of the second digital number, and each not-equal signal output from each exclusive-OR gate P, wherein N<P<M, and outputting a greater than signal indicating when the first digital number is greater than the second digital number; and an output OR gate receiving the NOR gate output signal from the equal to compare circuit and every greater than signal from the greater than compare circuit as inputs, and outputting a greater than or equal to signal indicating the first digital number is greater than or equal to the second digital number.

2. A greater than or equal to compare circuit according to claim 1, wherein the output of the OR gate is enabled by an enable signal.

3. A greater than or equal to compare circuit according to claim 1, wherein the enable signal is the output of an OR gate having inputs of a bit of the first or second digital number and the bit's complement signal.

4. A greater than or equal to compare circuit according to claim 1, wherein the gates are dynamic logic gates.

5. A method of performing dynamic branch prediction, comprising the steps of:

comparing an address stored in a branch target buffer with a current address of an executing program in a microprocessor;

generating an equal to signal for each bit of the stored address that is equal to a corresponding bit in the current address;

simultaneously generating a greater than signal for each bit of the stored address when that bit is greater than the corresponding bit in the current address and when every bit of greater significance than that bit in the stored address is equal to its corresponding bit in the current address, as is indicated by receiving every equal to signal for all bits of greater significance in the stored address;

generating a greater than or equal to signal when an equal to signal is generated for all bits or when a greater than signal is generated; and retrieving data associated with the address stored in the branch target buffer if a greater than or equal to signal is generated.

6. A method of performing dynamic branch prediction according to claim 5, wherein the step of generating a greater than or equal to signal occurs during a period that a bit of the stored address is not equal to that bit's complement signal.

7. A system for performing dynamic branch prediction, comprising:

means for comparing an address stored in a branch target buffer with a current address of an executing program in a microprocessor;

means for generating an equal to signal for each bit of the stored address that is equal to a corresponding bit in the current address;

means for simultaneously generating a greater than signal for each bit of the stored address when that bit is greater than the corresponding bit in the current address and when every bit of greater significance than that bit in the stored address is equal to its corresponding bit in the current address, as is indicated by receiving every equal to signal for all bits of greater significance in the stored address;

means for generating a greater than or equal to signal when an equal to signal is generated for all bits or when a greater than signal is generated; and means for retrieving data associated with the address stored in the branch target buffer if a greater than or equal to signal is generated.

8. A system for performing dynamic branch prediction according to claim 7, wherein the means for generating a greater than or equal to signal is enabled to output the greater than or equal signal during a period that a bit of the stored address is not equal to that bit's complement signal.

* * * * *

UNITED STATES PATENT AND TRADEMARK OFFICE
CERTIFICATE OF CORRECTION

PATENT NO. : 5,592,142
DATED : Jan. 7, 1997
INVENTOR(S) : Adams et al.

It is certified that error appears in the above-indentified patent and that said Letters Patent is hereby corrected as shown below:

[57] Abstract, line 7, please change "$1<N<M$" to --$1 \leq N \leq M$--.

[57] Abstract, line 18, please change "$N<P<M$" to --$N<P \leq M$--.

Col 3, line 53, please change "A4" to --$\overline{A4}$--.

Col 3, line 59, please change "A3" to --$\overline{A3}$--.

Col 5, line 18, please change both occurrences of "A4" to --$\overline{A4}$--.

Col 5, line 23, please change "A4" to --$\overline{A4}$--.

Col 5, line 33, please change "A3" to --$\overline{A3}$--.

Col. 8, line 6, please change "$1<N<M$" to --$1 \leq N \leq M$--.

Col. 8, line 20, please change "$N<P<M$" to --$N<P \leq M$--.

Signed and Sealed this

Twenty-fourth Day of June, 1997

*Attest:*

BRUCE LEHMAN

*Attesting Officer*     *Commissioner of Patents and Trademarks*